(12) United States Patent
Dumais et al.

(10) Patent No.: US 7,107,254 B1
(45) Date of Patent: Sep. 12, 2006

(54) PROBABLISTIC MODELS AND METHODS FOR COMBINING MULTIPLE CONTENT CLASSIFIERS

(75) Inventors: Susan T. Dumais, Kirkland, WA (US); Eric J. Horvitz, Kirkland, WA (US); Paul Nathan Bennett, Pittsburgh, PA (US)

(73) Assignee: Microsoft Corporation, Redmond, WA (US)

(*) Notice: Subject to any disclaimer, the term of this patent is extended or adjusted under 35 U.S.C. 154(b) by 620 days.

(21) Appl. No.: 09/850,172

(22) Filed: May 7, 2001

(51) Int. Cl.
*G06N 5/02* (2006.01)

(52) U.S. Cl. .............................. 706/50; 706/12; 706/14
(58) Field of Classification Search ................... 706/50, 706/12, 14
See application file for complete search history.

(56) References Cited

U.S. PATENT DOCUMENTS

| | | | |
|---|---|---|---|
| 5,493,692 A | | 2/1996 | Theimer et al. |
| 5,544,321 A | | 8/1996 | Theimer et al. |
| 5,555,376 A | | 9/1996 | Theimer et al. |
| 5,603,054 A | | 2/1997 | Theimer et al. |
| 5,611,050 A | | 3/1997 | Theimer et al. |
| 5,812,865 A | | 9/1998 | Theimer et al. |
| 6,021,403 A | | 2/2000 | Horvitz et al. ............... 706/45 |
| 6,137,911 A | * | 10/2000 | Zhilyaev ..................... 382/225 |
| 6,144,838 A | * | 11/2000 | Sheehan ..................... 434/362 |
| 6,233,570 B1 | | 5/2001 | Horvitz et al. ............... 706/11 |
| 6,260,035 B1 | | 7/2001 | Horvitz et al. ............... 706/60 |
| 6,262,730 B1 | | 7/2001 | Horvitz et al. .............. 345/337 |
| 6,466,232 B1 | | 10/2002 | Newell et al. |
| 6,484,010 B1 | * | 11/2002 | Sheehan ..................... 434/362 |
| 6,513,046 B1 | | 1/2003 | Abbott, III et al. |

(Continued)

OTHER PUBLICATIONS

Usama Fayyad, et al.; "The KDD Process for Extracting Useful Knowledge From Volumes of Data", Communications of the ACM, vo. 39, No. 11, Nov. 1996, p. 27–34.
Andy Harter, et al., A Distributed Location System for the Active Office, IEEE Network, 1994, pp. 62–70.
Guanling Chen, et al., A Survey of Context–Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270–283.
Marvin Theimer, et al., Operating System Issues for PDAs, In Fourth Workshop on Workstation Operating Systems, 1993, 7 pages.

(Continued)

*Primary Examiner*—Anthony Knight
*Assistant Examiner*—Joseph P. Hirl
(74) *Attorney, Agent, or Firm*—Amin & Turocy, LLP (57) ABSTRACT

The invention applies a probabilistic approach to combining evidence regarding the correct classification of items. Training data and machine learning techniques are used to construct probabilistic dependency models that effectively utilize evidence. The evidence includes the outputs of one or more classifiers and optionally one or more reliability indicators. The reliability indicators are, in a broad sense, attributes of the items being classified. These attributes can include characteristics of an item, source of an item, and meta-level outputs of classifiers applied to the item. The resulting models include meta-classifiers, which combine evidence from two or more classifiers, and tuned classifiers, which use reliability indicators to inform the interpretation of classical classifier outputs. The invention also provides systems and methods for identifying new reliability indicators.

30 Claims, 8 Drawing Sheets

U.S. PATENT DOCUMENTS

| | | | |
|---|---|---|---|
| 6,539,395 B1 * | 3/2003 | Gjerdingen et al. | ........ 707/102 |
| 6,549,915 B1 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B1 | 1/2005 | Robarts et al. | |
| 2001/0037324 A1 * | 11/2001 | Agrawal et al. | ................ 707/1 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

OTHER PUBLICATIONS

Roy Want, Active Badges and Personal Interactive Computing Objects, IEEE Transactions on Consumer Electronics, 1992, 11 pages, vol. 38–No. 1.

Bill N. Schilit, et al., The ParcTab Mobile Computing System, IEEE WWOS–IV, 1993, 4 pages.

Bill Schilit, et al., Context–Aware Computing Applications, In Proceedings of the Workshop on Mobile Computing Systems and Applications, Dec. 1994. pp. 85–90.

Bill N. Schilit, et al., Customizing Mobile Applications, Proceedings USENIX Symposium on Mobile and Location Independent Computing, Aug. 1993, 9 pages.

Mike Spreitzer, et al., Architectural Condsiderations for Scalable, Secure, Mobile Computing with Location Information, In the 14th International Conference on Distributed Computing Systems, Jun. 1994, pp. 29–38.

Mike Spreitzer et al., Scalable, Secure, Mobile Computing with Location Information, Communications of the ACM, Jul. 1993, 1 page, vol. 36–No. 7.

Roy Want, et al., The Active Badge Location System, ACM Transactions on Information Systems, Jan. 1992, pp. 91–102, vol. 10–No. 1.

Mark Weiser, Some Computer Science Issues in Ubiquitous Computing, Communications of the ACM, Jul. 1993, pp. 75–84, vol. 36–No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487–495.

Eric Horvitz, et al., In Pursuit of Effective Handsfree Decision Support: Coupling Bayesian Interference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123–128.

Eric Horvitz, et al., Attention–Sensitive Altering in Computing Systems, Microsoft Research, Aug. 1999.

Bill N. Schilit, et al., Disseminationg Active Map Information to Mobile Hosts, IEEE Network, 1994, pp. 22–32, vol. 8–No. 5.

Mark Billinghurst, et al., Wearable Devices: New Ways to Manage Information, IEEE Computer Society, Jan. 1999, pp. 57–64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19–21, 1996.

Mark Billinghurst, Research Directions in Wearable Computing, University of Washington, May, 1998, 48 pages.

Mark Weiser, The Computer for the 21st Century, Scientific American, Sep. 1991, pp. 94–104, vol. 265–No. 3.

Kagan Tumer, et al., Classifier Combining: Analytical Results and Implications, In Integrating Multiple Learned Models for Improving and Scaling Machine Learning Algorithms workshop at the Thirnteenth National Conference on Artificial Intelligence, Aug. 1996, 7 pages, Portland, OR.

Kentaro Toyama, et al., Bayesian Modality Fusion: Probablistic Integration of Multiple Vision Algorithms for Head Tracking, Fourth Asian Conference on Computer Vision, Jan. 2000, 8 pages, Taipei Taiwan.

Kevin Woods et al, Combination of Multiple Classifiers Using Local Accuracy Extimates, Apr. 1997, IEEE, 405–410.*

Kagan Tumer et al, Classifier Combining: Analytical Results and Implications, Aug. 1996, National Conference on Artificial Intelligence, 1–7.*

* cited by examiner

PROBABLISTIC MODELS AND METHODS FOR COMBINING MULTIPLE CONTENT CLASSIFIERS

TECHNICAL FIELD

The present invention generally relates to information management and in particular to a system and method for automatically classifying items.

BACKGROUND OF THE INVENTION

There are many applications for automatic classification of items such as documents, images, and recordings. To address this need, a plethora of classifiers have been developed. Examples include a priori rule-based classifiers, such as expert systems, and classifiers based on probabilistic dependency models learned from training data. Classifiers based on probabilistic dependency models include classifiers based on decision trees models, support vector machines, Bayesian belief networks, and neural networks.

Within each of these model types, varying the model assumption and/or the training technique can produce different classifiers. For example, different neural network models result depending on the number of levels selected and the number of nodes within each level. As a rule for complex classification problems, each classifier produces at least slightly different results and none of the classifiers provides correct classifications for every instance.

To improve classifier performance, it has been proposed to combine multiple classifiers to produce a single meta-classifier. One approach to combining classifiers has been to take a vote among the classifiers and classify items based on majority vote. Optionally, the votes can be weighted by the confidence levels the classifiers express with respect to their decisions. Another approach is to believe the classifier that expresses the highest confidence in its decision, i.e., provides the highest estimated probability that its decision is correct. Where classifiers do not provide probability estimates, probability estimates have been generated based on the classifier's performances on a fixed number of "nearest neighbors" in the training set. A further approach takes N classifiers j whose output is $p^j(c_i|x)$, the probability that classification $c_i$ is correct given input x, and selects the classification $c_i$ that maximizes:

$$\frac{1}{N}\sum_{j=1}^{N} p^j(c_i | x)$$

While these meta-classifiers often work better than any of the individual classifiers they combine, these meta-classifiers still commonly make mistakes. Thus, there remains an unsatisfied need for a meta-classifier or other classifier that generally makes fewer or less costly mistakes than currently available classifiers.

SUMMARY OF THE INVENTION

The following presents a simplified summary of the invention in order to provide a basic understanding of some of its aspects. This summary is not an extensive overview of the invention and is intended neither to identify key or critical elements of the invention nor to delineate its scope. The sole purpose of this summary is to present some concepts of the invention in a simplified form as a prelude to the more detailed description that is presented later.

The invention provides meta-classifiers and systems and methods for building meta-classifiers. A meta-classifier provides a determination or indication of whether an item belongs in a particular category. The meta-classifiers of the invention apply a probabilistic approach to combining evidence regarding the correct classification of items. Thus, meta-classifiers of the invention take the form of probabilistic dependency models. Using a set of training data and machine learning techniques, the probabilistic dependency models are constructed to effectively utilize evidence that can include the outputs of multiple classifiers.

In addition to classifier output, the probabilistic dependency models of the invention can consider additional evidence, such as one or more reliability indicators. The reliability indicators are, in a broad sense, attributes of the items being classified. These attributes can include characteristics of an item, source of an item, and meta-level outputs of classifiers applied to the item. In general, a reliability indicator provides an indication of a classifier's reliability in classifying certain groups of items. However, a reliability indicator can also point directly to an item's correct classification.

A probabilistic dependency model of the invention can be a decision tree with nodes corresponding to classical classifier outputs and reliability indicators. During the course of building a tree, it is often found that many classifiers have little or no effect on the classification determination. Thus, decision trees of the invention frequently employ only a subset of the classifiers whose outputs the trees combine. Furthermore, those classifiers that are employed by a tree are often present only on some branches and may not be encountered during the processing of particular items. As a result, the invention permits a substantial computational savings as compared to meta-classifiers that apply every classifier to every category determination and/or to every item.

When constructed with a reasonably sized data set, the decisions trees capture a substantial portion of the predictive capability provided collectively by all the classifiers and reliability indicators. Thus, the invention provides meta-classifiers that are not only computationally efficient, but are also nearly optimal in combining the classifiers within the limits of identifying only certain reliability indicators.

Another aspect of the invention provides a method of tuning classifiers. The method comprises training a probabilistic dependency models that employs classical outputs of the classifier and one or more reliability indicators. The classical classifier outputs often include a score. In the un-tuned classifier, the decision to place an item in a category would depend on whether the score exceeded a critical value. The invention allows the critical value to depend on the values or one or more reliability indicators. The invention can also provide refined confidence estimates for classification decisions.

A further aspect of the invention is a method of identifying useful reliability indicators. Potentially effective reliability indicators are tested by employing them in probabilistic dependency models to combine or tune classifiers. Effective reliability indicators are identified from improvements in the accuracy and/or efficiency of the combined or tuned classifiers.

Other advantages and novel features of the invention will become apparent from the following detailed description of the invention and the accompanying drawings. The detailed description and drawings provide certain illustrative examples of the invention. These examples are indicative of but a few of the various ways in which the principles of the invention can be employed.

DETAILED DESCRIPTION OF THE INVENTION

Figure 1:
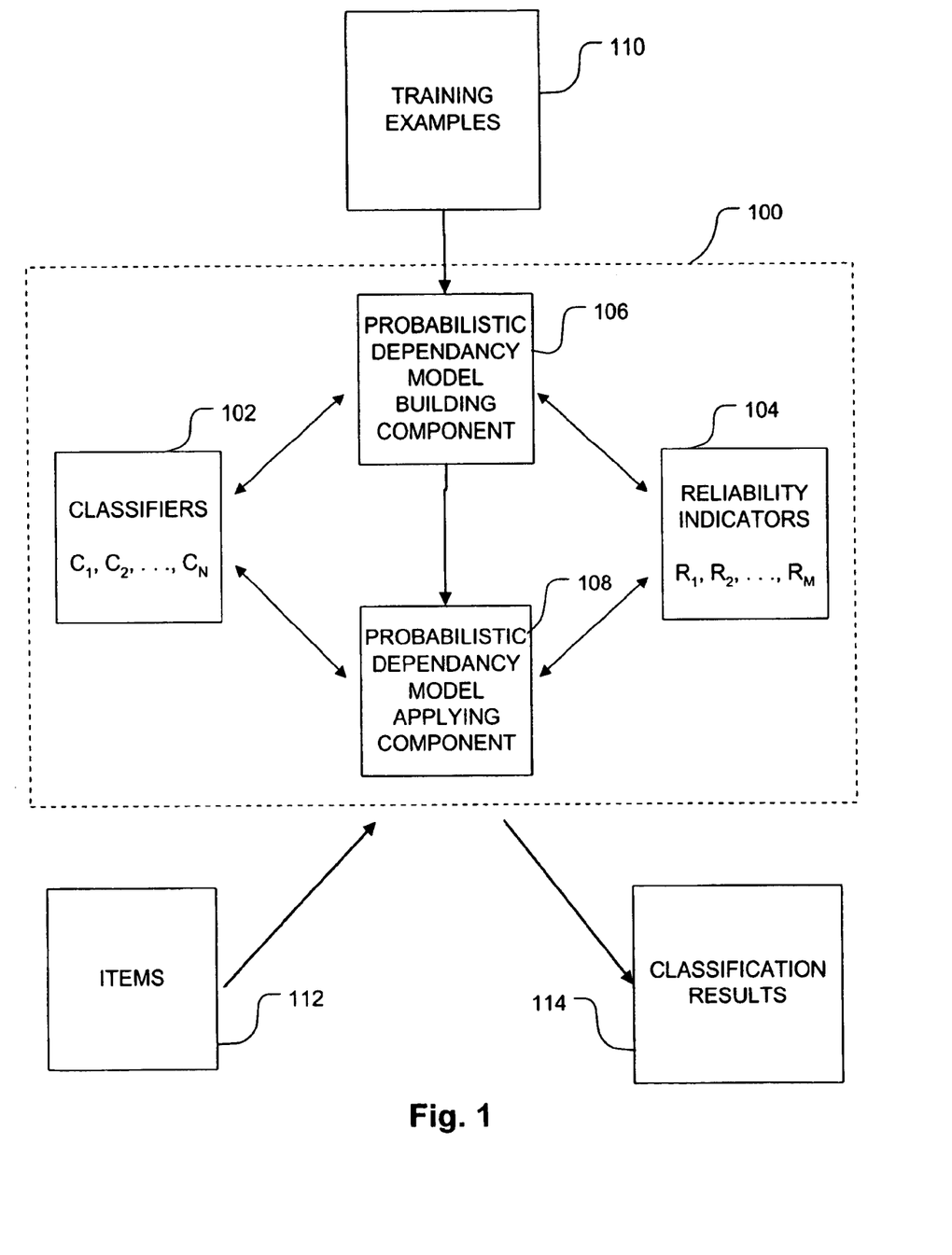
FIG. 1 is a high level schematic illustration of a system for generating classifiers and classifying items according to the present invention.

FIG. 1 is a high level schematic of a computer system 100 provided by the present invention to facilitate item classification, identification, and/or utilization. System 100 includes a component 102 implementing classifiers $C_1$, $C_2$, ..., $C_N$, a component 104 implementing reliability indicators $R_1$, $R_2$, ..., $R_M$, a probabilistic dependency model builder 106, and a component 108 implementing probabilistic dependency models produced by model builder 106.

Probabilistic dependency model builder 106 employs training data 110 to formulate and train probabilistic dependency models. Model builder 106 combines evidence in the form of outputs from one or more classifiers and zero or more reliability indicators. Where the outputs of one or more classifiers and one or more reliability indicators are not predictive of the correct classification or are redundant with other evidence, model builder 106 can drop them from the model. Thus, probabilistic dependency models that are produced by model builder 106 do not necessarily contain dependencies on all the classifier and reliability indicators whose evidence is considered.

Component 108 applies the probabilistic dependency models to items 112 to obtain classification results 114. Classification results include, for example, a determination of whether an item belongs in a particular category, a determination of which of several categories an item belongs in, a confidence level that an item belongs in a particular category, and/or a utility for placing an item in a particular category. Classification results 114 can be recorded on computer readable media, reported to a user, on a monitor for example, and/or employed by another computer system, to organize a database for example.

Figure 9:
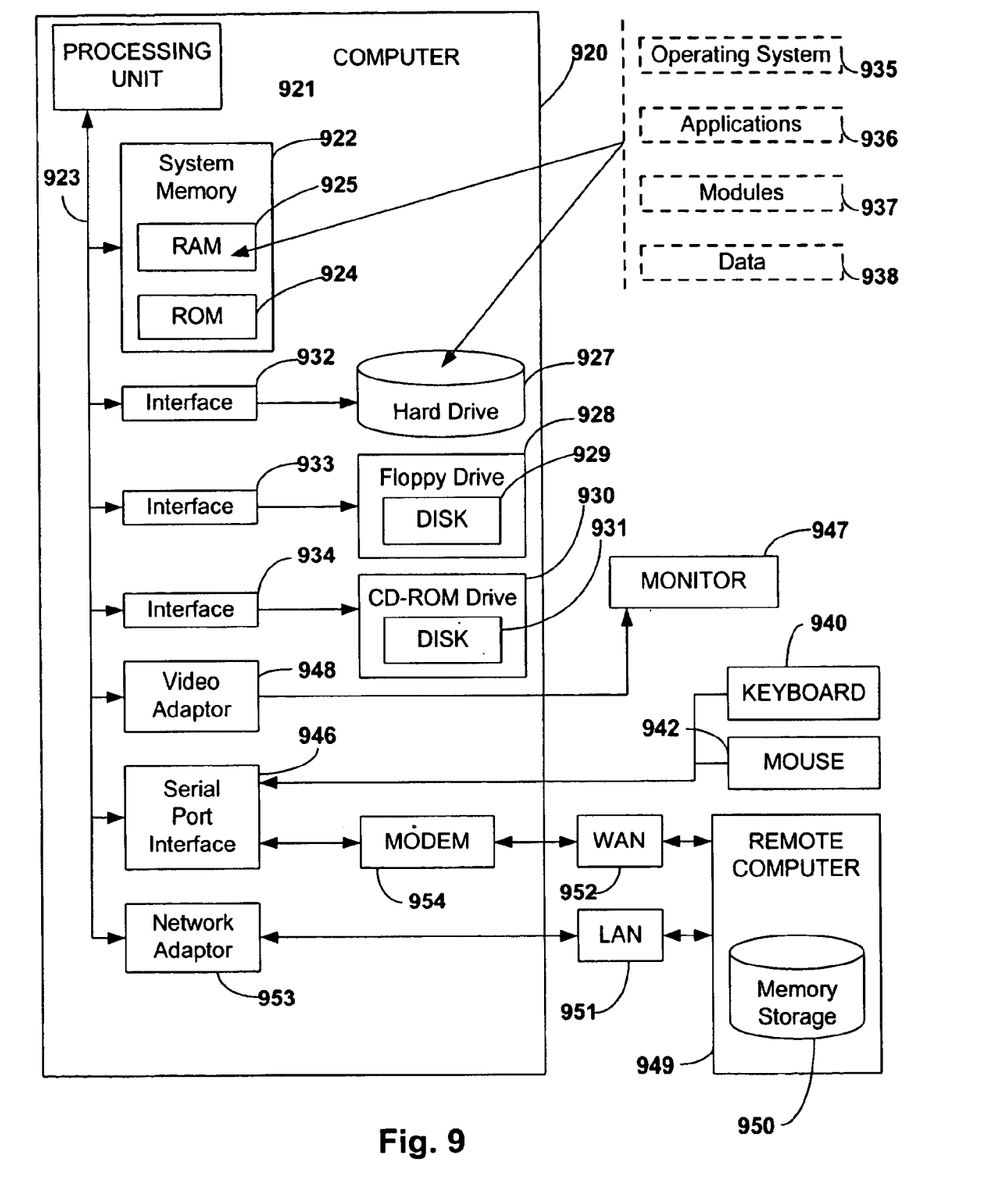
FIG. 9 is a schematic of a computer system of the present invention.

As used in this application, a "computer system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Computer systems can also be intermingled and inseparable. FIG. 9 illustrates an exemplary computer system that can include various aspects of the invention and is discussed in more detail later.

Items classified by the invention can be of any type susceptible to classification. For example, the items can be texts, images, or sound recordings. Examples of texts include web pages, email messages, and news articles. Examples of images include medical images such as microscope images, MRI images, X-rays, fingerprints, works of art, and videos, such as might be taken by a robot going about a task. Examples of sound recordings include music recordings and voice recordings.

The categories can also be of any suitable type, depending on the type of items. Examples of text classifications include categorizations by subject matter, author (where otherwise unknown), and grade level of writing. Examples of email classifications include whether or not junk, whether personal or business, and whether related to illegal activity. Examples of image classifications include whether or not consistent with a diagnosis (medical), owner of fingerprints, and identity of object being viewed. Examples of sound recording classifications include genre of music, identity of speaker, and identity of words being spoken. A classification problem can be determining which one of a finite plurality of predefined categories an item belongs to where the item belong to one and only one of the categories. Alternatively, the classification problem is determining whether an item belongs with respect to each of one or more predefined categories wherein the item can belong to none, some, or all of the categories.

The classifiers 102 combined or tuned by probabilistic dependency model builder 106 can be developed manually or can be learned automatically from training data. The classifiers can be of any suitable type, including, for example, a priori rule based classifiers and probabilistic dependency model based classifiers. Examples include expert system classifiers, naive Bayes classifiers, maximum likelihood classifiers, neural network classifiers, support vector machine (SVM) classifiers, statistical language model classifiers, and decision tree classifiers. If the classifiers are probabilistic dependency models, they are developed separately from the probabilistic dependency models of the invention.

The classifiers 102 are configured to make a decision, produce a score and/or produce other output with respect to each of one or more categories. Optionally, depending on the classification problem, the classifiers can operate under the assumption that each item belongs to one and only one of a finite plurality of categories, in which case the classifiers can output a single decision and/or a single score. For a particular classification problem, the individual classifiers produce correct classifications in a certain percentage of all cases.

Probabilistic dependency model builder 106 employs classical classifier outputs. These are the standard output of the classifiers 102. Classical classifier outputs can be yes/no decisions, scores, or other outputs that directly relate to an item's classification. A classifier score is a numerical output that reflects a confidence level or utility associated with a classification decision. The utility of making a classification decision is the benefit of making a correct classification weighted by the probability the classification is correct less the cost of making an incorrect classification weighted by the probability the classification is incorrect. The scores can be used in the probabilistic dependency models of the invention regardless of whether the scores are all defined in the same manner or follow from the same underlying assumptions, such as cost/benefit estimates.

Reliability indicators 104 are attributes, other than classical classifier outputs, of the items being classified. Attributes can be virtually anything that characterizes or describes an item. While the output of a classifier is an attribute of an item, reliability indicators are generally less complex than classifiers and are generally, but with some exceptions, not sufficient to correctly classify an item. Nevertheless, reliability indicators can span a wide range of complexity and sophistication, including even such observations as nature of the source of the content being classified and other contextual features associated with the usage of the content. Reliability indicators are generally predictive of the reliability or ability of one or more classifiers in producing a correct determination for an item or how classifier output is best interpreted to classify an item, e.g., what score should be considered sufficient to accept a classification. Classifier outputs, other than classical classifier outputs, can be employed as reliability indicators. Classifier output that can be employed as reliability indicators include, for example, meta-level outputs—intermediary results that are not normally reviewed or summaries of the status of sets of attributes. For example, where the classifier is expressed as a decision tree, the output can be the identity of the node or leaf of the decision tree arrived at after making the first or second branch from the root. Decision trees are commonly constructed with greedy algorithms whereby the first few decisions consider the factors identified as being most effective in differentiating the items. Therefore, the decisions made within the first few branches made by a decision tree classifier may be the most reliable ones and might be more useful than the final classifier output when considered in combination with other classifiers and/or reliability indicators.

Aside from classifier outputs, there are innumerable examples of potentially suitable reliability indicators. For text-based classifications, a reliability indicator can be a simple formula applied to the text, such as the number of words, the average word length, the collective frequency of the words "you" and "I", or, in formatted documents, the font used. Background characteristics can also be reliability indicators of texts. Examples of background characteristics include the corpora from which the text was drawn (source) and a creation date given for the text. Reliability indicators for images can include resolution, average gray level, or average pixel-to-pixel contrast. Reliability indicators for recordings can include length, volume, fidelity, or average frequency. Additional reliability indicators can be formed from composites of two or more reliability indicators. For example two binary valued reliability indicators can be used to form a single new reliability indicator with four or fewer possible values.

The following are examples of reliability indicators that can be used in text classification:

DocLength:
  Number of words in a document.
NumOOVWords:
  Number of words in a document that were not seen in the training set.
NumUniqueWords:
  Number of unique words in a document (unique means duplicates are not counted).
NumUniqueOOVWords:
  Number of unique words in a document that were not seen in the training set.
EffectiveDocLength:
  DocLength−NumOOVwords
EffectiveUniqueWords:
  NumUniqueWords−NumUniqueOOVWords
PercentUnique
  NumUniqueWords/DocLength
PercentOOV:
  NumOOVWords/DocLength
PercentUniqueOOV:
  NumUniqueOOVWords/NumUniqueWords
NumWordsRemovedByFS:
  Number of words in a document removed by feature selection. Feature selection is a process sometimes used in Naïve Bayes models. Feature selection involves selecting those words that were most effective in distinguishing document class within the training set. The words that are less effective in distinguishing document class are the ones removed.
NumUniqueWordsRemovedByFS:
  Number of unique words in a document removed by feature selection.
DocLengthAfterFS:
  EffectiveDocLength−NumWordsRemovedByFS
UniqueAfterFS:
  EffectiveUniqueWords−NumUniqueWordsRemovedByFS
PercentRemoved:
  (NumWordsRemovedByFS+NumOOVWords)/DocLength
UniquePercentRemoved:
  (NumUniqueWordsRemovedByFS+NumUniqueOOVWords)/NumUniqueWords
NumWordsOccurringInPosBeforeFS:
  Number of words in a document that occurred in positively classified training examples.
NumWordsOccurringInPosAfterFS:
  Number of words in a document that occurred in positively classified training examples after feature selection.
NumWordsOccurringInNegBeforeFS:
  Number of words in a document that occurred in negatively classified training examples.
NumWordsOccurringInNegAfterFS:
  Number of words in a document that occurred in negatively classified training examples after feature selection
PercentInPosBeforeFS:
  NumWordsOccurringInPosBeforeFS/EffectiveDocLength
PercentInPosAfterFS:
  NumWordsOccurringInPosAfterFS/DocLengthAfterFS
NumUniqueWordsOccurringInPosBeforeFS:
  Number of unique words in a document that occurred in positively classified training examples.
NumUniqueWordsOccurringInPosAfterFS:
  Number of unique words in a document that occurred in positively classified training examples after feature selection.
NumUniqueWordsOccurringInNegBeforeFS:
  Number of unique words in a document that occurred in negatively classified training examples.
NumUniqueWordsOccurringInNegAfterFS:
  Number of unique words in a document that occurred in negatively classified training examples after feature selection.

UpercentInPosBeforeFS:
   NumUniqueWordsOccurringInPosBeforeFS/EffectiveUniqueWords
UpercentInPosAfterFS:
   NumUniqueWordsOccurringInPosAfterFS/UniqueAfterFS
PercentInNegBeforeFS:
   NumWordsOccurringInNegBeforeFS/EffectiveDocLength
PercentInNegAferFS:
   NumWordsOccurringInNegAfterFS/DocLengthAfterFS
UpercentInNegBeforeFS:
   NumUniqueWordsOccurringInNegBeforeFS/EffectiveUniqueWords
UpercentInNegAferFS:
   NumUniqueWordsOccurringInNegAferFS/UniqueAfterFS
NumWordsOccurringInPos>NegBeforeFS:
   Number of words in a document whose total occurrences in positively classified training examples is greater than in negatively classified training examples.
NumWordsOccurringInPos>NegAfterFS:
   Number of words in a document whose total occurrences in positively classified training examples is greater than in negatively classified training examples, after feature selection.
NumUniqueWordsOccurringInPos>NegBeforeFS:
   Number of unique words in a document whose total occurrences in positively classified training examples is greater than in negatively classified training examples.
NumUniqueWordsOccurringInPos>NegAfterFS:
   Number of unique words in a document whose total occurrences in positively classified training examples is greater than in negatively classified training examples, after feature selection.
NumWordsOccurringInNeg>PosBeforeFS:
   Number of words in a document whose total occurrences in negatively classified training examples is greater than in positively classified training examples.
NumWordsOccurringInNeg>PosAfterFS:
   Number of words in a document whose total occurrences in negatively classified training examples is greater than in positively classified training examples, after feature selection.
NumUniqueWordsOccurringInNeg>PosBeforeFS:
   Number of unique words in a document whose total occurrences in negatively classified training examples is greater than in positively classified training examples.
NumUniqueWordsOccurringInNeg>PosAfterFS:
   Number of unique words in a document whose total occurrences in negatively classified training examples is greater than in positively classified training examples, after feature selection.
PercentagePosBeforeFS:
   NumWordsOccurringInPos>NegBeforeFS/EffectiveDocLength
PercentagePosAfterFS:
   NumWordsOccurringInPos>NegAfterFS/DocLengthAfterFS
UpercentagePosBeforeFS:
   NumUniqueWordsOccurringInPos>NegBeforeFS/EffectiveUniqueWords
UpercentagePosAfterFS:
   NumUniqueWordsOccurringInPos>NegAferFS/UniqueAfterFS
PercentageNegBeforeFS:
   NumWordsOccurringInNeg>PosBeforeFS/EffectiveDocLength
PercentageNegAfterFS:
   NumWordsOccurringInNeg>PosAfterFS/DocLengthAfterFS
UpercentageNegBeforeFS:
   NumUniqueWordsOccurringInNeg>PosBeforeFS/EffectiveUniqueWords
UpercentageNegAfterFS:
   NumUniqueWordsOccurringInNeg>PosAfterFS/UniqueAfterFS
PercentPredictingPositive:
   Percentage of classifiers predicting the document is classified positively.
PercentAgreeWithBest:
   Percentage of classifiers agreeing with the classifier determined to perform best based on a set of training examples used for validation.

The following reliability indicators arise out of Naïve Bayes models. There are two versions of each indicator, one corresponding to a multi-variate Bernoulli model and one corresponding to a multinomial (unigram) model. In the Bernoulli model, the probability of a document is calculated by taking a product with one term for each word in the vocabulary. If $PR_i$ is the probability that word i is present, then the product has a term $PR_i$ for each vocabulary word that is present in the document and a term $(1-PR_i)$ for each vocabulary word that is absent. Means and variances are taken over the vocabulary words. In the Unigram model, the probability of a document is taken as the product of the probabilities for each word appearing in the document. Thus there are multiple terms for words that appear more than once and there are no terms for vocabulary words that do not appear in the document. Means and variances are taken over the words appearing in the document.

MeanOfWordGivenNeg:
   Mean probability of a word given that the document is classified negatively.
VarOfWordGivenNeg:
   Variance of the probability of a word given that the document is classified negatively.
MeanOfWordGivenPos:
   Mean probability of a word given that the document is classified positively.
VarOfWordGivenPos:
   Variance of the probability of a word given that the document is classified positively.
MeanOfLogWordGivenNeg:
   Mean of the log of the probability of a word given that the document is classified negatively.
VarOfLogWordGivenNeg:
   Variance of the log of the probability of a word given that the document is classified negatively.
MeanOfLogWordGivenPos:
   Mean of the log of the probability of a word given that the document is classified positively.
VarOfLogWordGivenPos:
   Variance of the log of the probability of a word given that the document is positively.
MeanOfLogOfRatioOfWordGivenClass:
   In probabilistic models, a log odds ratio indicates which of two possibilities an event supports. One such log odds ratio is the log of the ratio of the probability of a word given that the document is classified positively to the probability of a word given that the document is classified negatively. This indicator variable is the mean of this quantity.
VarOfLogOfRatioOfWordGivenClass:
   The variance of the log odds ratio.

The probabilistic dependency models generated and trained by probabilistic dependency model builder 106 are models that make classification predictions using a probabilistic approach to combining evidence. Examples of probabilistic dependency models include decision trees, neural networks, and Bayesian belief networks. Where the evidence considered includes the outputs of two or more classifiers, probabilistic dependency model builder 106 can be described as a classifier combiner and is said to produce meta-classifiers. Where the evidence considered includes the outputs of only one classifier, probabilistic dependency model builder 106 can be described as a classifier tuner. Probabilistic dependency model outputs can be of the same type as classifier outputs and often include a confidence level or utility associated with a classification decision.

Figure 2:
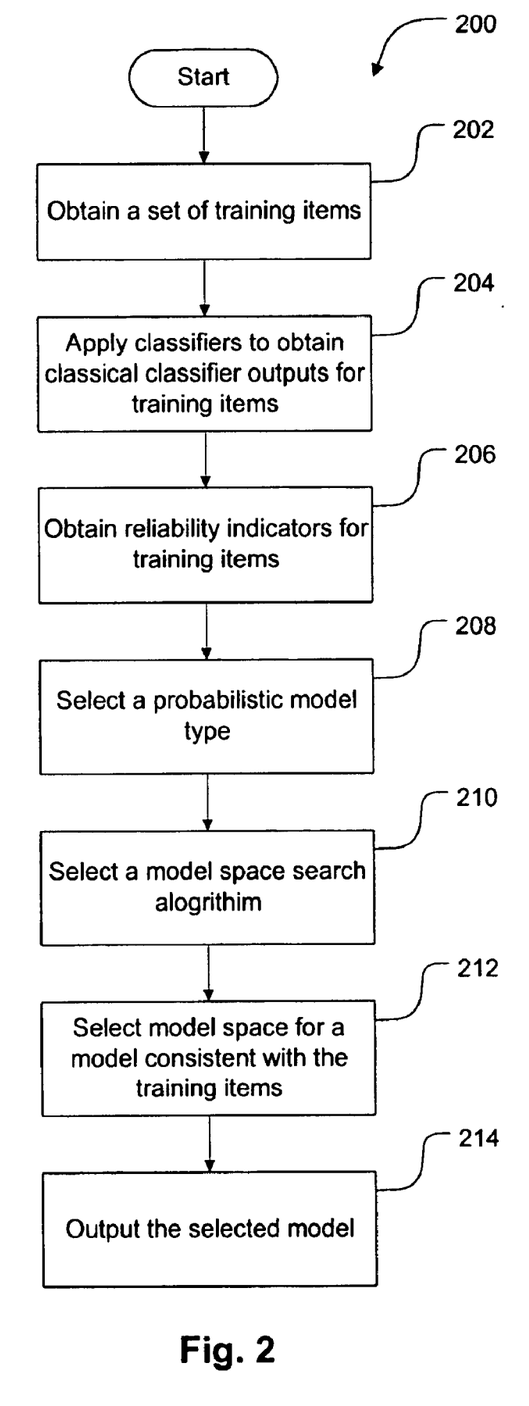
FIG. 2 is a flow chart for a method of generating classifiers according to one aspect of the present invention.

FIG. 2 is a flow diagram providing a generalized example of a method 200 by which probabilistic dependency model builder 106 can operate. Actions 202, 204 and 206 are concerned with obtaining a set of training examples. For purposes of illustration, method 200 treats these actions as separate. Action 202 is obtaining a set of training items. The training items are items for which the correct classification is known with a high level of confidence. Action 204 is obtaining classifier outputs by applying classifiers to the training items. Action 206, which can take place before or after Action 204, is obtaining reliability indicator values. These can be provided with the items or determined automatically.

If the training data is accurate and complete, the resulting models are generally more reliable. However, probabilistic dependency models can be built from sets of training examples that are incomplete or inaccurate. For example, it is permissible if reliability indicators are missing or if their values are inaccurate for some of the training example. Likewise, it is permissible for some of the classifications to be inaccurate.

Action 208 is selecting a probabilistic dependency model type. Decision trees are commonly used, but other probabilistic dependency models are also suitable, including for example, neural networks and Bayesian belief networks. For some of these models, such as the aforementioned network models, structural features may need to be specified. In a neural network, the number of layers and the number of nodes per layer may require specification. On the other hand, part of the model structure can be determined as part of the training process.

The selection of a probabilistic dependency model can limit the relationships between inputs and outputs that can be captured by the model. The set of all possible relationships is referred to as the model space. The model space is chosen so that there is a high probability that either the actual relationship between inputs and outputs or a close approximation thereto is in the model space. A decision tree provides a suitable model space for combining classifiers and reliability indicators.

Once a model space is chosen, the next action, 210, is selecting an algorithm to search the model space for a model consistent with the training data. The choice of a search algorithm depends on the model type, but even within each model type there are generally a host of choices. In most instances, a complete search of the model space is impractical and there is no guarantee that the model found is the most consistent with the data among those models in the model space. However, commonly used search algorithms are generally sufficient to find a model whose match to the data is reasonably good within the limits of the model space and the data.

Action 212 is applying the search algorithm to find a model consistent with the training data. This is also referred to as training the model. Once the model is trained, or found, it is output in action 214. The output can be a display on a monitor showing the dependencies of the model. However, whether or not the model is displayed, the output is generally recorded on a computer readable media, whereby it is ready for use in a computer system for classifying items.

As noted above, a decision tree provides a suitable model space for combining classifiers and reliability indicators according to the present invention. Decision trees are composed of one or more, generally a plurality, of decision nodes and a plurality of leaf nodes. Decision trees classify instances by sorting them down the tree from a root decision node to a leaf node. Decision trees branch at decision nodes, which represents tests of item attributes. In the present case, the item attributes are either classical classifier outputs or reliability indicators. The leaf nodes represent outcomes. Leaf and decision nodes provide a convenient way to describe a decision tree, but a decision tree can also be expressed as a set of rules.

Figure 3:
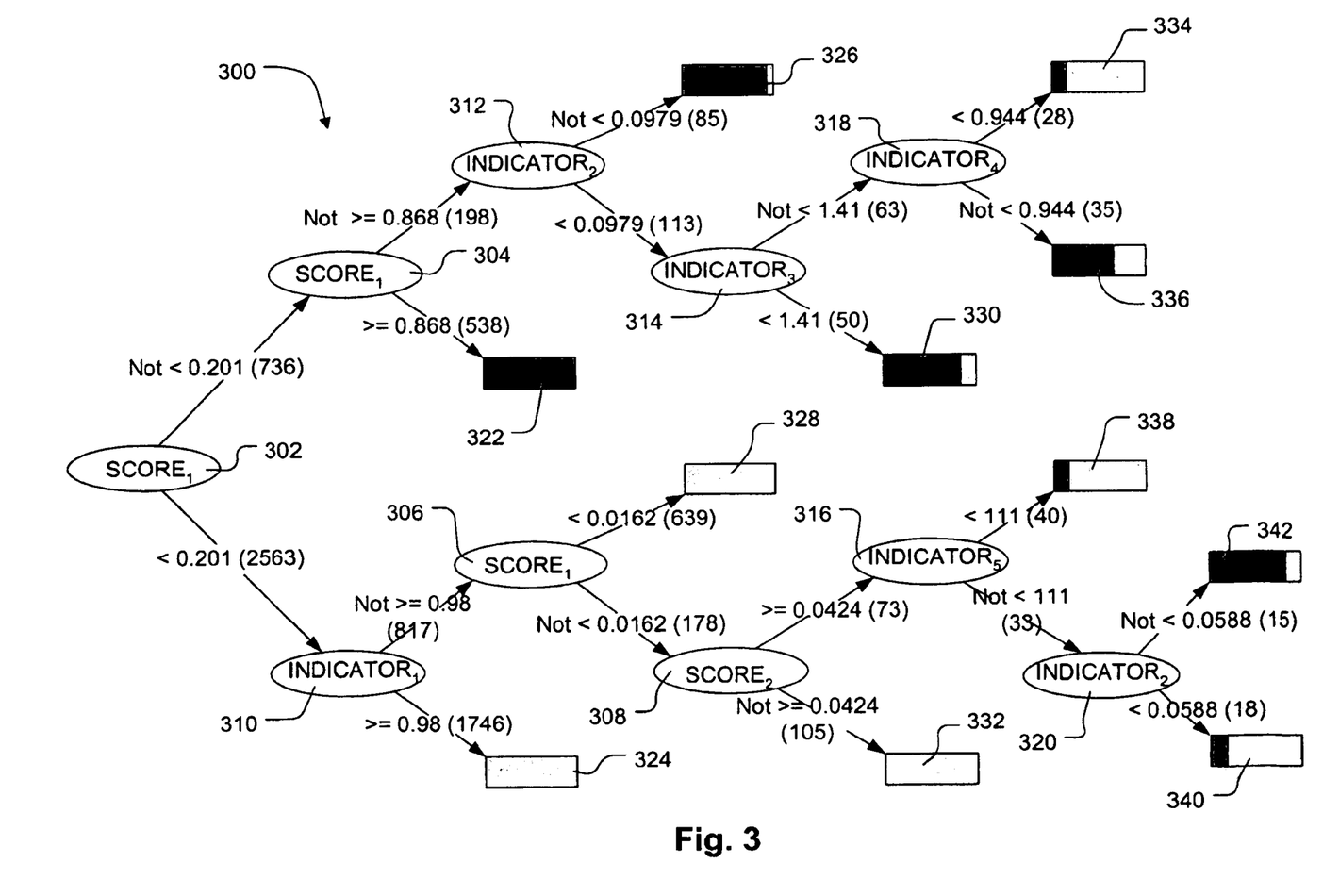
FIG. 3 is an illustration of a decision tree according to a further aspect of the present invention.

FIG. 3 gives an example of a decision tree 300 produced by model builder 106. Decision tree 300 contains decision nodes 302, 304, 306, and 308 having dependencies on $SCORE_1$ and $SCORE_2$, which are classical outputs from two different classifiers. Decision tree 300 also includes decision nodes 310, 312, 314, 316, 318, and 320 having dependencies on five different reliability indicators. The numbers in parenthesis following each test give the number of training examples sorted down the corresponding branch. Decision tree 300 sorts items according to whether they belong in a category. The output of the decision tree, provided at leaf nodes 322, 324, 326, 328, 330, 332, 334, 336, 338, 340, and 342, is given as the probability that an item belongs in the category. The probability is represented by the fraction of the rectangular box that is in the darker shade.

Decision trees produced by model builder 106 can be stored in computer-readable medium. A suitable data structure includes first data fields containing data representing attributes to test, second data fields corresponding to the first data fields and containing data representing values against which to compare the attributes, third data fields containing data representing outcomes, and fourth data fields facilitating determination of relationships among instances of the first, second, and third data fields.

Figure 4:
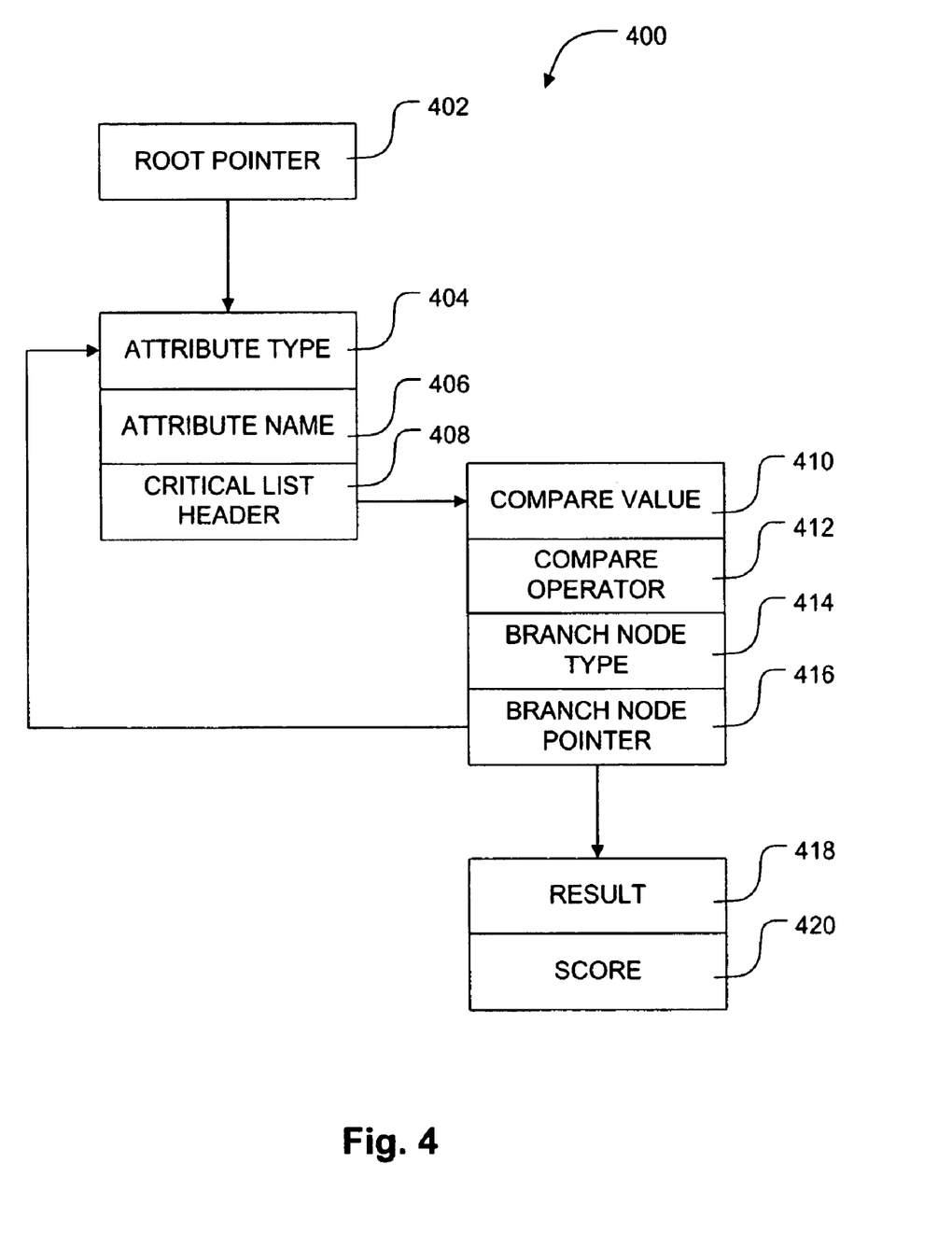
FIG. 4 is a schematic of a data structure according to a further aspect of the present invention.

FIG. 4 provides an example of a data structure 400 suitable for storing a decision tree produced by model builder 106. In this example, the ATTRIBUTE TYPE 404 and ATTRIBUTE NAME 406 correspond to the first data field and are associated with decision nodes. ATTRIBUTE TYPE 404 can be the attribute data type (Boolean, integer, real number, etc.) and ATTRIBUTE NAME 406 can be a string, index, or pointer that can be used to identify the attribute to be tested. The attribute can be a classical classifier output or a reliability indicator. A data structure of the invention generally includes one or more reliability indicators in addition to classical outputs from one or more classifiers.

At each decision node there are two or more branches. To allow the number of branches off a decision node to vary, data structure 400 uses a critical list header to relate an arbitrary number compare values to each decision node. The CRITICAL LIST HEADER 408 can be, for example, the first element in an array, a pointer to an array, or a header element for a linked list. The list elements include COMPARE VALUEs 410, which correspond to the second data field. In this example, additional fields stored adjacent to second data fields include data fields identifying a COM PARE OPERATOR 412 (<, =, =, etc.) and data fields identifying the node to branch to if the test is satisfied. BRANCH NODE TYPE 414 identifies whether the branch is to a decision node or a leaf node. BRANCH NODE POINTER 416 is an index or pointer that identifies the branch node.

RESULT 418 and SCORE 420 correspond to third data fields and to leaf nodes. In this non-limiting example, RESULT 418 indicates a category and SCORE 420 represents the probability, based on the training data, that the item belongs in that category. In the case of a binary decision, the categories can be "member of the class" and "not a member of the class".

ROOT POINTER 402 identifies the decision node at the root of the tree. A root pointer is not a necessary part of the data structure. For example, a convention can be adopted whereby the first data element in the data structure is the root node. In general, there are many ways to represent decision tree structural relationships. In this example, ROOT POINTER 402, CRITICAL LIST HEADER 408, and BRANCH NODE POINTER 416 are all fourth data fields representing decision tree relationships among the first, second, and third data fields.

Any suitable methods can be employed to build decision trees from the training data. Suitable algorithms include the ID3 algorithm, the C4.5 algorithm, and Bayesian learning algorithms. Most decision tree building algorithms use a top down greedy approach to search through the universe of all possible decision trees for one that accurately classifies examples. The algorithms begin by asking which attribute should be tested first and answers the question by selecting the attribute that, in and of itself, best classifies the training examples in a statistical sense. A branch is created for each possible value of the attribute and a new node is placed at the end of each branch. The algorithm repeats at each of the new nodes using only the training examples that would be sorted to that node.

Where an attribute is a continuous variable, such as a classifier score, part of the process of selecting the attribute that best classifies the data is selecting an attribute value on which to split the data. This can be accomplished, for example, with a gradient search starting from several randomly chosen initial values, or by choosing percentile values. As illustrated in FIG. 3, the result is a decision tree node comparing the score to a particular value. As further illustrated by FIG. 3, the same score can be tested at several decision nodes, with the value against which the score is compared differing from one node to another.

When building a decision tree, steps are taken to avoid over-fitting the data. When data is over-fit, the model begins to capture random variations or noise that is unique to the training data. Over-fitting degrades the performance of the model when applied to items outside the training set. Over-fitting is avoided by either limiting the size of the tree or pruning the tree after its initial growth. In either case, the approach to avoiding over-fitting the data can be based on one or more of the following: a distinct set of training example to evaluate the utility of certain branches; a statistical test to determine whether a particular branch is likely to improve the model fit outside of the training set; or an explicit measure of the complexity of a tree, whereby nodes are removed or avoided to limit the complexity.

A Bayesian algorithm for learning decision trees involves assigning scores to various possible tree structures. For example, a Bayesian algorithm can proceed as follows:

1. Begin with one leaf node.
2. Score the current tree structure.
3. For every possible decision tree that can be generated by replacing a leaf node with a binary split of the data based on one of the reliability indicators or one of the classical classifier outputs:
4. Calculate a score for the possible structure.
5. If the best score from step 4 is better than the current score, make the corresponding possible structure the current structure and goto step 2.
6. Return the current structure.

For discrete variables, binary splits of the data are constructed by making one branch for a particular variable value and another branch for all other variable values. Binary splits for continuous variables can be accomplished for example, by considering a finite set of possible split values, or by conducting a gradient search.

In a Bayesian algorithm, the score is the posterior probability, or an approximation thereto, of the tree structure being correct given the observed data. The posterior probability is given by:

$$p(T^h/D) = c \times p(D/T^h) p(T^h)$$

where $T^h$ is the hypothesized tree structure, D is the observed data, and c is a constant that is independent tree structure and can therefore be ignored.

The data-independent probability of various tree structures, $p(T^h)$, can be taken as one (all structures equal probable) or can be given some functionality that favors simple trees. For example, $p(T^h)$ can be given by:

$$p(T^h) = K^n$$

where n is the number of leaf nodes and ? is a number such that 0<?<1.

The probability of observing a set of data given a particular tree structure, $p(D|T^h)$, is taken as the product of the probabilities of observing each of the individual data points. The probability of an individual data point is determined by sorting it down the tree to a leaf node. The probability for the data point can be taken as the fraction of all data points sorted to that leaf node that have the same outcome as that observed for the data point in question. Alternatively, an MAP method, such as Dirichlet priors, can be employed to generate probability estimates for particular observations.

Where probabilistic dependency model builder 106 combines the output of a plurality of classifiers, the resulting model can be viewed as a meta-classifier combining the evidence of the classifiers combined together with any reliability indicators considered. Where model builder 106 combines outputs from a single classifier with one or more reliability indicators, the resulting model can be viewed as a tuned classifier.

Component 108 applies the probabilistic dependency models to items 112 to produce classification results 114. Component 108 selectively invokes classifiers 102 to obtain classifier outputs relating to the items. Component 108 also obtains values for reliability indicator 104, where needed. Component 108 applies the necessary inputs to the probabilistic dependency model, or models, to obtain classification results 114.

One aspect of the invention is a system that employs a probabilistic dependency model to tune a single classifier. This is accomplished by building the probabilistic dependency model from a set of training examples using the classifier outputs and one or more reliability indicators. Many classifiers produce a score and make a classification decision based on a comparison of the score with some critical value. A probabilistic dependency model can result in different critical values being selected depending on the type of items being classified.

Figure 5:
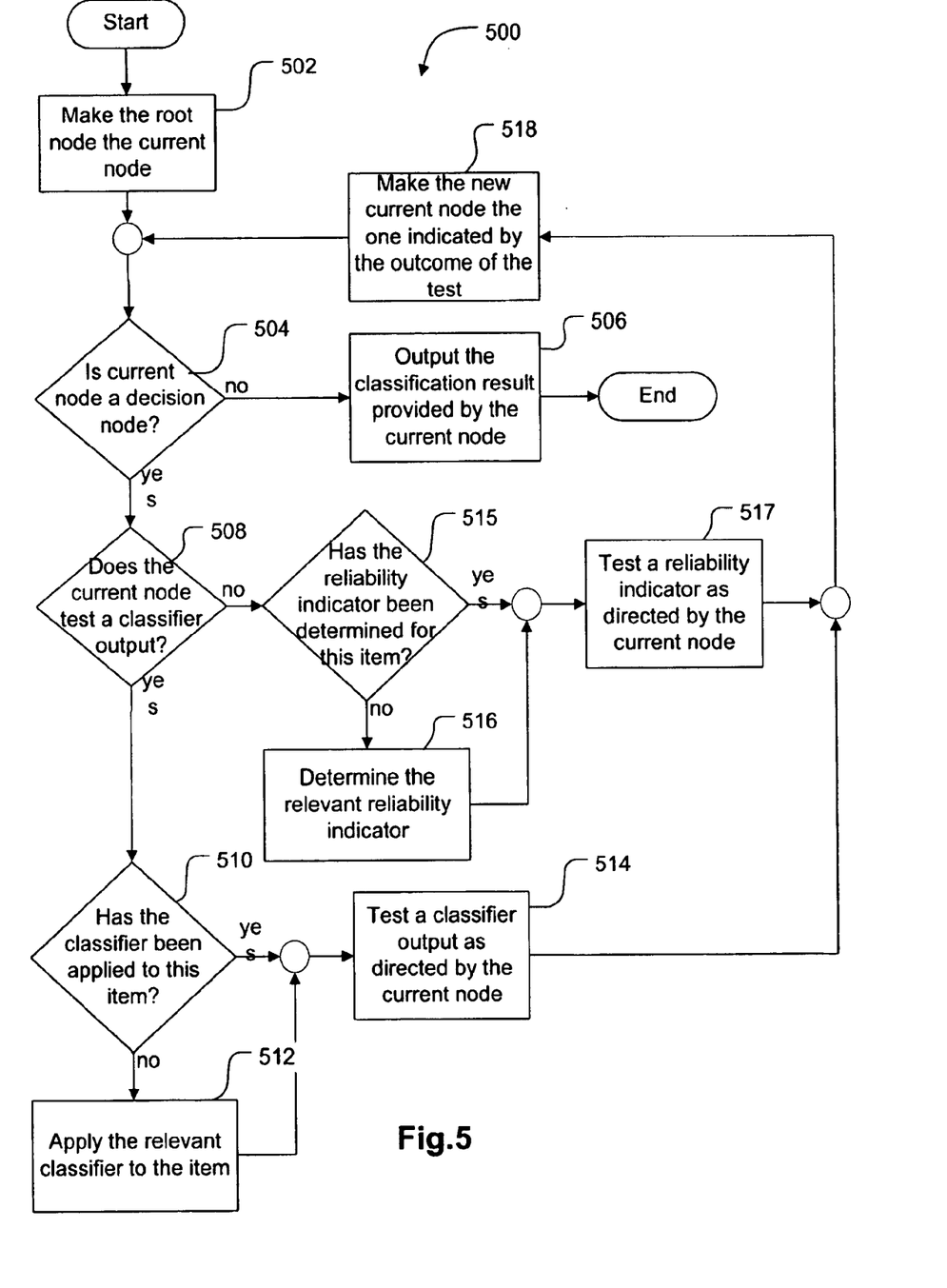
FIG. 5 is a flow chart of a method of applying a decision tree according to a further aspect of the present invention.

FIG. 5 provides a flow chart of a procedure 500 component 108 can employ when the probabilistic dependency model is a decision tree. The first action, 502, is to make the root node the current node. Action 504 determines whether the current node is a decision node. If not, it is a leaf node and action 506 outputs a classification decision provided by the leaf node.

When the current node is a decision node, action 508 determines whether the node tests a classifier output. In this example, classifier outputs are only obtained when needed. Therefore, action 510 is determining whether the relevant classifier has been applied to the item. If not, the classifier is applied in action 512 before proceeding to action 514. Action 514 is testing the classifier output as directed by the current node to determine which node to branch to. Actions 514, 515, and 516 are similar, but test reliability indicators that are not classifier outputs. Action 518 makes the branch node the current node and loops to action 504.

Figure 6:
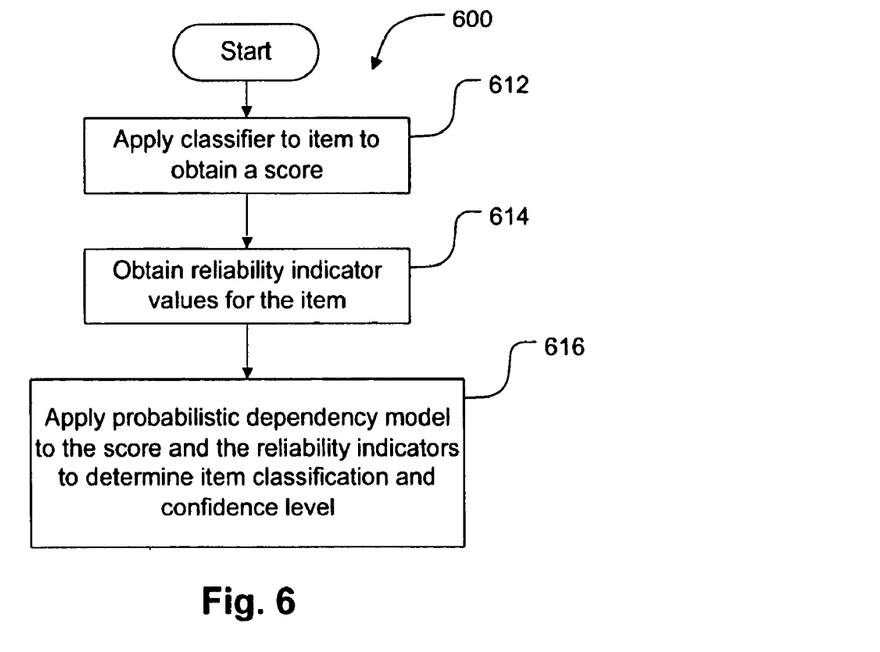
FIG. 6 is a high level flow diagram of a method of applying a classifier tuned according to a further aspect of the present invention.

FIG. 6 provides an example of a procedure 600 that can be followed by component 108 to obtain a single classification decision when the probabilistic dependency model tunes a classifier providing a score. Action 610 is obtaining the classifier score. Action 612 is obtaining values for one or more reliability indicators. These values may be provided with the item or alternatively, they may be obtained by calling modules that compute them. With these inputs, component 108 proceeds with action 614, which is applying the probabilistic dependency model to provide a classification decision and a confidence level for that decision.

Figure 7:
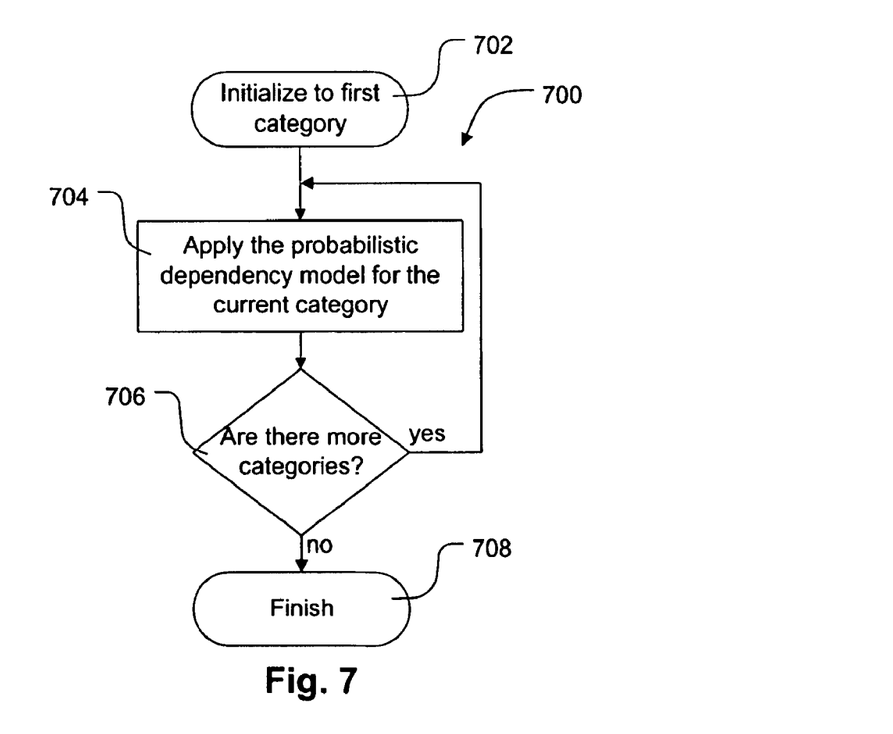
FIG. 7 is a flow chart of a method of applying classifiers of the invention to produce multiple category determinations.

Component 108 can implement multiple probabilistic dependency models providing classification decisions for a corresponding number of categories. FIG. 7 provides a generalized flow chart for a procedure 700 by which component 108 can provide classification decisions for each item with respect to a finite plurality of categories. After initializing to the first category in action 702, the probabilistic dependency model for the current category is applied to the item in action 704 to determine a classifier output for that category. The output could be, for example, a decision as to whether the item belongs in that category, a likelihood the item belongs in that category, a utility of placing the item in that category, or a combination of the forgoing. While there are further categories, action 706 causes the procedure repeats until all the desired classification outputs for that item have been obtained. When there are no further categories, action 706 transfers control to action 708, which terminates the procedure.

By means of the present invention, effective reliability indicators can be used to significantly improve the performance of one or more classifiers. Effective reliability indicators can be identified by building probabilistic dependency models with and without the reliability indicators. If a reliability indicator is effective, the accuracy and/or efficiency of the resulting model will be greater when the model employs the reliability indicator. The accuracy and/or efficiency of a model is measured relative to a given classification problem.

Figure 8:
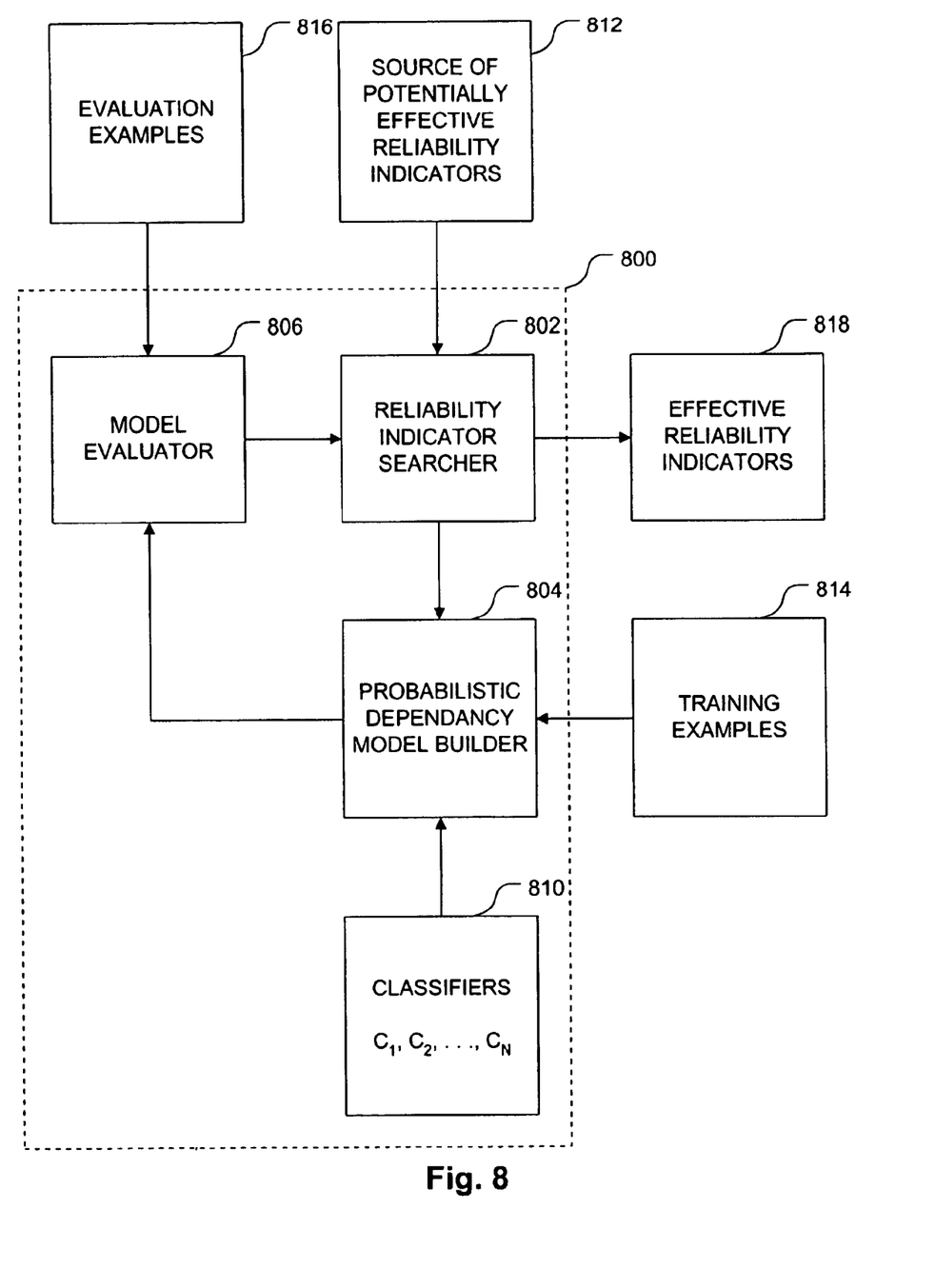
FIG. 8 is a high level schematic of a system for identifying effective reliability indicators provided by a further aspect of the present invention.

FIG. 8 is a high level schematic of a computer system 800 for identifying effective reliability indicators. Computer system 800 has three main components: reliability indicator searcher 802, probabilistic dependency model builder 804, and model evaluator 806. Computer system 800 also comprises component 810, which implements one or more classifiers. Reliability indicator searcher 802 draws on a source 812 of potentially effective reliability indicators and identifies candidates to provide to probabilistic dependency model builder 804.

Model builder 804 employs training examples 814 to build probabilistic dependency models that combine the evidence provided by the candidate reliability indicator, one more classifiers 810, and optionally other reliability indicators. Component 806 evaluates the models against a set of evaluation examples 816. The evaluator provides model performance measures to component 802. The performance measures generally include at least one measure of accuracy, such as percentage of correct classifications produced by the model. In addition, the outputs can include measures of efficiency, such as the number of times it was necessary to obtain classifier output in applying the model to the training examples. Reliability indicator searcher 802 compares the performance measures obtained with various potentially effective reliability indicators and provides output 818 identifying the ones that provide significant improvements in performance.

In one aspect of the invention, the selection of potentially effective reliability indicators is carried out automatically by a computer system. For example, the source of potentially effective reliability indicators 812 can be a set of item attributes. Reliability indicator searcher 802 can randomly, or systematically, search among these attributes for effective reliability indicators. Reliability indicator searcher 802 can also search for reliability indicators formed from composites of attributes. For example, taking two Boolean valued attributes, searcher 802 can formulate a single potentially effective reliability indicator that is true when both the underlying attributes are true and false otherwise.

The present invention can also be employed to identify useful classifiers. As with effective reliability indicators, effective classifiers can be identified by building probabilistic dependency models with and without the classifiers. If a classifiers is effective, the accuracy and/or efficiency of the resulting model will be greater when the model employs the classifier.

FIG. 9 illustrates an exemplary computer system 920 of the present invention. Computer system 920 is a personal or server computer, including a processing unit 921, a system memory 922, and a system bus 923 that couples various system components including the system memory 922 to the processing unit 921. The processing unit 921 can be any of various commercially available processors. Dual microprocessors and other multi-processor architectures also can be used as the processing unit 921.

System bus 923 can include a memory bus or memory controller, a peripheral bus, and a local bus using any of a variety of commercially available bus architectures. The system memory 922 includes read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the server computer 920. Although the description of computer-readable media above refers to a hard disk, a removable magnetic disk and a CD, other types of media that are readable by a computer, such as magnetic cassettes, flash memory cards, digital video disks, Bernoulli cartridges, and the like, can also be used in the exemplary operating environment. A number of program modules can be stored in the drives and RAM 925, including an operating system 935, one or more application programs 936, other program modules 937, and program data 938.

A user can enter commands and information into the computer 920 through a keyboard 940 and pointing device, such as a mouse 942. Other input devices (not shown) can include a microphone, joystick, game pad, satellite dish, scanner, or the like. These and other input devices are often connected to the processing unit 921 through a serial port interface 946 that is coupled to the system bus 923, but can be connected by other interfaces, such as a parallel port, game port or a universal serial bus (USB). A monitor 947 or other type of display device is also connected to the system bus 923 via an interface, such as a video adapter 948. In addition to the monitor, computer 920 typically includes other peripheral output devices (not shown), such as speakers and printers.

The computer 920 can operate in a networked environment using logical connections to one or more remote computers, such as a remote server or client computer 949. The remote computer 949 can be a workstation, a server computer, a router, a peer device or other common network node, and typically includes many or all of the elements described relative to the computer 920, although only a memory storage device 950 has been illustrated in FIG. 9. The logical connections depicted in FIG. 9 include a local area network (LAN) 951 and a wide area network (WAN) 952. Such networking environments are commonplace in offices, enterprise-wide computer networks, intranets and the Internet.

When used in a LAN networking environment, the computer 920 is connected to the local network 951 through a network interface or adapter 953. When used in a WAN networking environment, the server computer 920 typically includes a modem 954, or is connected to a communications server on the LAN, or has other means for establishing communications over the wide area network 952, such as the Internet. The modem 954, which can be internal or external, is connected to the system bus 923 via the serial port interface 946. In a networked environment, program modules depicted relative to the computer 920, or portions thereof, can be stored in the remote memory storage device. The network connections shown are exemplary and other means of establishing a communications link between the computers can be used.

The present invention is described with reference to components of computer system 920 and to acts and symbolic representations of operations that are performed by the computer 920, unless indicated otherwise. Such acts and operations can be referred to as being computer-executed. These acts and operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 929, and CD-ROM 931) to thereby reconfigure or otherwise alter the computer system's operation, as well as other processing of signals. The memory locations where data bits are maintained are physical locations that have particular electrical, magnetic, or optical properties corresponding to the data bits.

The present invention is illustrated with respect to programming methodologies and/or computer architecture and a particular example, however, various programming methodologies and/or computer architectures suitable for carrying out the present invention can be employed and fall within the scope of the hereto appended claims. The invention has been described with reference to particular aspects of the invention. Obviously, modifications and alterations will occur to others upon reading and understanding the foregone detailed description. It is intended that the invention be construed as including all such modifications alterations, and equivalents thereof.

What is claimed is:

1. A computer system for classifying items, comprising:
   a plurality of classifiers;
   a computer system component comprising probabilistic dependency models, one for each of a plurality of categories, the computer system component applies the probabilistic dependency models to an item to provide with respect to each of the plurality of categories an indication of whether the item belongs;
   wherein the probabilistic dependency models collectively employ outputs from the plurality of classifiers; and
   the outputs employed by the probabilistic dependency models vary among the probabilistic dependency models.

2. The computer system of claim 1, wherein the dependency models collectively employ one or more reliability indicators.

3. The computer system of claim 1, wherein the probabilistic dependency models are decision trees.

4. The computer system of claim 1, wherein the items are texts.

5. A computer system for classifying items, comprising:
   a plurality of classifiers; and,
   a computer system component that applies a probabilistic dependency model to classify an item, wherein the probabilistic dependency model contains dependencies on one or more classical outputs from the plurality of classifiers and dependencies on one or more reliability indicators.

6. The computer system of claim 5, wherein the computer system outputs a quantitative measure relating to confidence that the item belongs in a category.

7. The computer system of claim 6, wherein the probabilistic dependency models are decision trees.

8. The computer system of claim 6, wherein the items are texts.

9. A computer system, comprising:
   a plurality of classifiers; and,
   a first computer system component that learns, from training examples, probabilistic dependency models for classifying items according to one or more reliability indicators together with classical outputs from the plurality of classifiers.

10. The computer system of claim 9, further comprising a second computer system component that repeatedly invokes the first component to learn probabilistic dependency models employing various potentially effective reliability indicators and compares the performances of the resulting probabilistic dependency models to identify reliability indicators that are effective.

11. The computer system of claim 9, wherein the first computer system component employs the classical outputs from classifiers and the reliability indicators in the same manner.

12. The computer system of claim 9, wherein the probabilistic dependency models are decision trees.

13. The computer system of claim 9, wherein the items are texts.

14. A computer readable medium having computer executable instructions for performing steps comprising:
   implementing a plurality of classifiers adapted to receive and classify at least one item, the plurality of classifiers each generating a score related to classification of the at least one item; and
   for each of one or more categories, facilitating classification, selection, and/or utilization of the at least one item with a probabilistic dependency model that employs one or more of the scores and, in addition, one or more reliability indicators.

15. The computer readable medium of claim 14, wherein:
   the instructions implement a different probabilistic dependency model for each of two or more categories;
   the probabilistic dependency models are based on subsets of parameters selected from the group consisting of the scores and the reliability indicators; and
   the subsets of parameters vary among the probabilistic dependency models.

16. A system for classifying items, comprising:
   means for determining a model that classifies the items based on a probabilistic approach that combines information about the items including one or more classical outputs of classifiers and one or more reliability indicators; and
   means for applying the model to classify the items.

17. A computer-readable medium having stored thereon a data structure useful in classifying items, comprising:
   first data fields containing data representing an attribute to test, wherein the attributes represented include both classical classifier outputs and reliability indicators;
   second data fields corresponding to the first data fields and containing data representing values against which to compare the attributes;
   third data fields containing data representing classifier outcomes;
   fourth data fields facilitating determination of relationships among instances of the first, second, and third data fields, the relationships having a decision tree structure with the first and second data fields corresponding to decision nodes and the third data fields corresponding to leaf nodes.

18. The computer-readable medium of claim 17, wherein the data represented by the first data fields comprises classical classifier outputs from a plurality of classifiers.

19. A method of generating a classifier, comprising:
   obtaining a set of training examples;
   applying a probabilistic approach that uses the training examples to develop a model that combines evidence to provide an output relating to whether an item belongs in a category; and
   storing the model in a computer-readable media for use as a classifier;
   wherein the evidence comprises one or more classical outputs of other classifiers and one or more attributes of the item other than classical outputs of classifiers.

20. A method of identifying useful reliability indicators, comprising
   obtaining potentially useful reliability indicators;
   applying the method of claim 19 using various of the potentially useful reliability indicators as evidence; and
   comparing the resulting classifiers to identify which of the potentially useful reliability indicators are, in fact, useful.

21. The method of claim 19, wherein the model is a decision tree.

22. The method of claim 19, wherein the evidence comprises classical outputs from two or more classifiers.

23. A method of classifying items, comprising:
   obtaining the items in computer readable format,
   employing a computer to classify the item using a classifier generated according to the method of claim 19.

24. A method of classifying items, comprising:
   applying probabilistic dependency models, one for each of a plurality of categories, to an item stored in computer readable format to provide an output relating to whether the item belongs in the category with respect to each of the plurality of categories;
   wherein the probabilistic dependency models collectively contain dependencies on outputs from a plurality of classifiers; and
   the outputs considered by the probabilistic dependency models vary among the probabilistic dependency models.

25. The method of claim 24, wherein the dependency models collectively contain dependencies based on one or more reliability indicators.

26. The method of claim 24, wherein the probabilistic dependency models are decision trees.

27. A method of combining a plurality of classifiers to classify items, comprising:
   sequentially applying tests to the items to obtain test results; and
   classifying the items based on the test results,
   wherein the sequence of tests applied varies among the items in that the outcome of one or more tests affects whether another test is applied, whereby the classifiers utilized vary depending on the items.

28. The method of claim 27, wherein one or more of the tests involves a reliability indicator.

29. The computer system of claim 10, wherein the second component automatically selects the potentially effective reliability indicators.

30. The method of claim 23, wherein the items are texts.

* * * * *